United States Patent
Kumar et al.

(10) Patent No.: US 12,430,535 B2
(45) Date of Patent: Sep. 30, 2025

(54) ARTIFICIAL INTELLIGENCE (AI) DRIVEN ESTIMATED SHIPMENT DELIVERY TIME ADVISOR

(71) Applicant: ACCENTURE GLOBAL SOLUTIONS LIMITED, Dublin (IE)

(72) Inventors: Abhijit Kumar, Bangalore (IN); Amartya Ray, Mumbai (IN); Arvind Maheswaran, Bangalore (IN); Pratap Simha, C. S, Karnataka (IN); Ravikant Singh, Ambernath East (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1283 days.

(21) Appl. No.: 17/161,361

(22) Filed: Jan. 28, 2021

(65) Prior Publication Data
US 2022/0237432 A1 Jul. 28, 2022

(51) Int. Cl.
*G06N 3/042* (2023.01)
*G06N 3/08* (2023.01)
*G06Q 10/0635* (2023.01)
*G06Q 10/083* (2024.01)

(52) U.S. Cl.
CPC ........... *G06N 3/042* (2023.01); *G06N 3/08* (2013.01); *G06Q 10/0635* (2013.01); *G06Q 10/083* (2013.01); *G06Q 10/0838* (2013.01)

(58) Field of Classification Search
CPC ....... G06Q 10/08345; G06Q 10/08355; G06Q 50/28; G06F 3/0482
USPC ......................................................... 705/334
See application file for complete search history.

(56) References Cited

U.S. PATENT DOCUMENTS

| | | | |
|---|---|---|---|
| 10,007,889 B2 * | 6/2018 | Arunapuram | G06Q 10/047 |
| 10,346,784 B1 * | 7/2019 | Powell | G06Q 10/0639 |
| 10,997,545 B1 * | 5/2021 | Bhagwat | G06K 19/0716 |
| 11,037,055 B2 * | 6/2021 | Han | G06F 16/487 |
| 11,300,419 B2 * | 4/2022 | Gao | G05D 1/0088 |

(Continued)

FOREIGN PATENT DOCUMENTS

CN 110110903 8/2019

OTHER PUBLICATIONS

"Predicting Shippint Time with Machine learning" Published by Dspace@MIT (Year: 2019).*

(Continued)

*Primary Examiner* — Zeina Elchanti
(74) *Attorney, Agent, or Firm* — Mannava & Kang, P.C.

(57) ABSTRACT

An Artificial Intelligence (AI) based delivery time estimation system employs a plurality of delivery time estimation models or actual time of arrival (ATA) estimation models to provide ATA estimates for shipments. Each of the ATA estimation models is trained on historical data from a plurality of external data sources to generate an ATA estimate for a given delivery route via a specific delivery mode. The ATA estimates are generated based on current data retrieved for a shipment from the external data sources. The time series data sets retrieved from the external data sources for the historical data and the current data are transformed into corresponding categorical data. The categorical data is converted into binary data to be provided to the plurality of ATA estimation models for training purposes or to a trained, selected ATA estimation model for generating an ATA estimate.

19 Claims, 13 Drawing Sheets

(56) References Cited

U.S. PATENT DOCUMENTS

| | | | | |
|---|---|---|---|---|
| 2004/0010428 | A1* | 1/2004 | Lee | G06Q 10/025 705/6 |
| 2004/0044469 | A1* | 3/2004 | Bender | G01C 21/36 701/532 |
| 2010/0185476 | A1* | 7/2010 | Eager | G06Q 10/08 705/7.11 |
| 2011/0161241 | A1* | 6/2011 | Jani | G06Q 10/08355 705/338 |
| 2012/0233085 | A1* | 9/2012 | Zimberoff | G06Q 10/083 705/330 |
| 2014/0180955 | A1* | 6/2014 | Podgurny | G06Q 10/0875 705/335 |
| 2015/0347959 | A1* | 12/2015 | Skaaksrud | H04W 52/40 705/333 |
| 2016/0042321 | A1 | 2/2016 | Held | |
| 2018/0025318 | A1* | 1/2018 | Baggott | G06Q 10/047 705/334 |
| 2019/0114564 | A1* | 4/2019 | Ferguson | G06Q 10/06315 |
| 2020/0349497 | A1* | 11/2020 | Dearing | G06Q 10/0834 |
| 2021/0080263 | A1* | 3/2021 | Zhu | G01C 21/165 |
| 2021/0304133 | A1* | 9/2021 | Anandam | G06N 20/00 |
| 2022/0004985 | A1* | 1/2022 | Neumann | G01C 21/3492 |
| 2022/0051283 | A1* | 2/2022 | Chen | G06Q 30/0224 |
| 2022/0237432 | A1* | 7/2022 | Kumar | G06Q 10/083 |
| 2022/0276066 | A1* | 9/2022 | Beaurepaire | G01C 21/3492 |
| 2023/0206170 | A1* | 6/2023 | Neumann | G06Q 10/08355 705/338 |

OTHER PUBLICATIONS

Antoine Charles Jean Jonquais et al., "Predicting Shipping Time with Machine Learning", Massachusetts Institute of Technology, Jun. 2019 (44 pages).

Konstantinos Konstantinou, "Calculation of estimated time of arrival using artificial intelligence", Chalmers University of Technology, 2019, (78 pages).

* cited by examiner

| INFORMATION 1102 | SOURCE 1104 | DATA TYPE FROM SOURCE 1106 | INITIAL TREATMENT 1108 | FINAL DATA TYPE 1110 | FINAL TREATMENT 1112 |
|---|---|---|---|---|---|
| SHIPMENT ID | SHIPMENT / TRANSACTIONAL | ALPHA NUM | NA | ALPHA NUM | NA |
| SOURCE - DESTINATION | SHIPMENT / TRANSACTIONAL | CATEGORICAL | NA | CATEGORICAL | ONE HOT ENCODING |
| MODE | SHIPMENT / TRANSACTIONAL | CATEGORICAL | NA | CATEGORICAL | ONE HOT ENCODING |
| CARRIER | SHIPMENT / TRANSACTIONAL | CATEGORICAL | NA | CATEGORICAL | ONE HOT ENCODING |
| RISK DUE TO CUSTOMS CLEARANCE DELAY | SHIPMENT / TRANSACTIONAL | CATEGORICAL | NA | CATEGORICAL | ONE HOT ENCODING |
| RISK DUE TO CUSTOMER BEHAVIOR | CALCULATED | NUMERIC | CLUSTERING & CENTRAL TENDENCY | NUMERIC | NORMALIZATION (MIN, MAX METHOD) |
| ETA (FOR TRAINING SET) | SHIPMENT / TRANSACTIONAL | NUMERIC | NA | NUMERIC | NORMALIZATION (MIN, MAX METHOD) |
| TRANSACTIONAL WEATHER ACROSS ALL LEGS OF THE ROUTE (MET. DEPT FORCAST) | EXTERNAL | TIME SERIES | RULE BASED PATTERN ANALYSIS & CLASSIFICATION | CATEGORICAL | ONE HOT ENCODING |
| RISK DUE TO EQUIPMENT RELIABILITY | EXTERNAL | TIME SERIES | WEIBULL STATISTICS & CLASSIFICATION | CATEGORICAL | ONE HOT ENCODING |
| RISK EMANATING FROM PORT, ROAD OR CANAL CONGESTION AT ANY LEG OF THE ROUTE | EXTERNAL | TIME SERIES | RULE BASED PATTERN ANALYSIS & CLASSIFICATION | CATEGORICAL | ONE HOT ENCODING |
| GEO-POLITICAL RISKS EMANATING FROM NLP ON NEWS ARTICLES | EXTERNAL | FREE TEXT | NLP BASED CLASSIFICATION | CATEGORICAL | ONE HOT ENCODING |
| TAGGING OF ACCIDENT-PRONE LEGS | EXTERNAL | CATEGORICAL | NA | CATEGORICAL | ONE HOT ENCODING |
| LONG TERM RISKS EMANATING FROM DATA ANALYSIS OF CLIMATE CHANGE DATA | EXTERNAL | TIME SERIES | RULE BASED PATTERN ANALYSIS & CLASSIFICATION | CATEGORICAL | ONE HOT ENCODING |

ARTIFICIAL INTELLIGENCE (AI) DRIVEN ESTIMATED SHIPMENT DELIVERY TIME ADVISOR

BACKGROUND

Predicting the estimated time of arrival of a shipment which may include a package with non-living things enclosed in packing material or a non-package including non-living or living things for the consignee who will receive the shipment is essential to improve customer experience and to create visibility in the logistics network. Providing a customer with an accurate estimated delivery date is not easy in a complex supply chain. Various complications such as but not limited to inclement weather, port congestion, customs process delays, disruptions such as strikes and embargoes, accidents, etc., may impact the transit time of the shipment. Accordingly, delivery time estimates need to account for all these factors. Logistics companies depend on networks—both physical and digital—which must function harmoniously amid high volumes, and time-sensitive deadlines. Artificial Intelligence (AI) offers logistics companies the ability to optimize network orchestration to degrees of efficiency that cannot be achieved with human thinking alone.

BRIEF DESCRIPTION OF DRAWINGS

Features of the present disclosure are illustrated by way of examples shown in the following figures. In the following figures, like numerals indicate like elements, in which:

FIG. 11 shows a table that includes details of some features or attributes of the shipment/package, that are processed for the generation of the ATA estimate in accordance with the examples.

DETAILED DESCRIPTION

Figure 1:
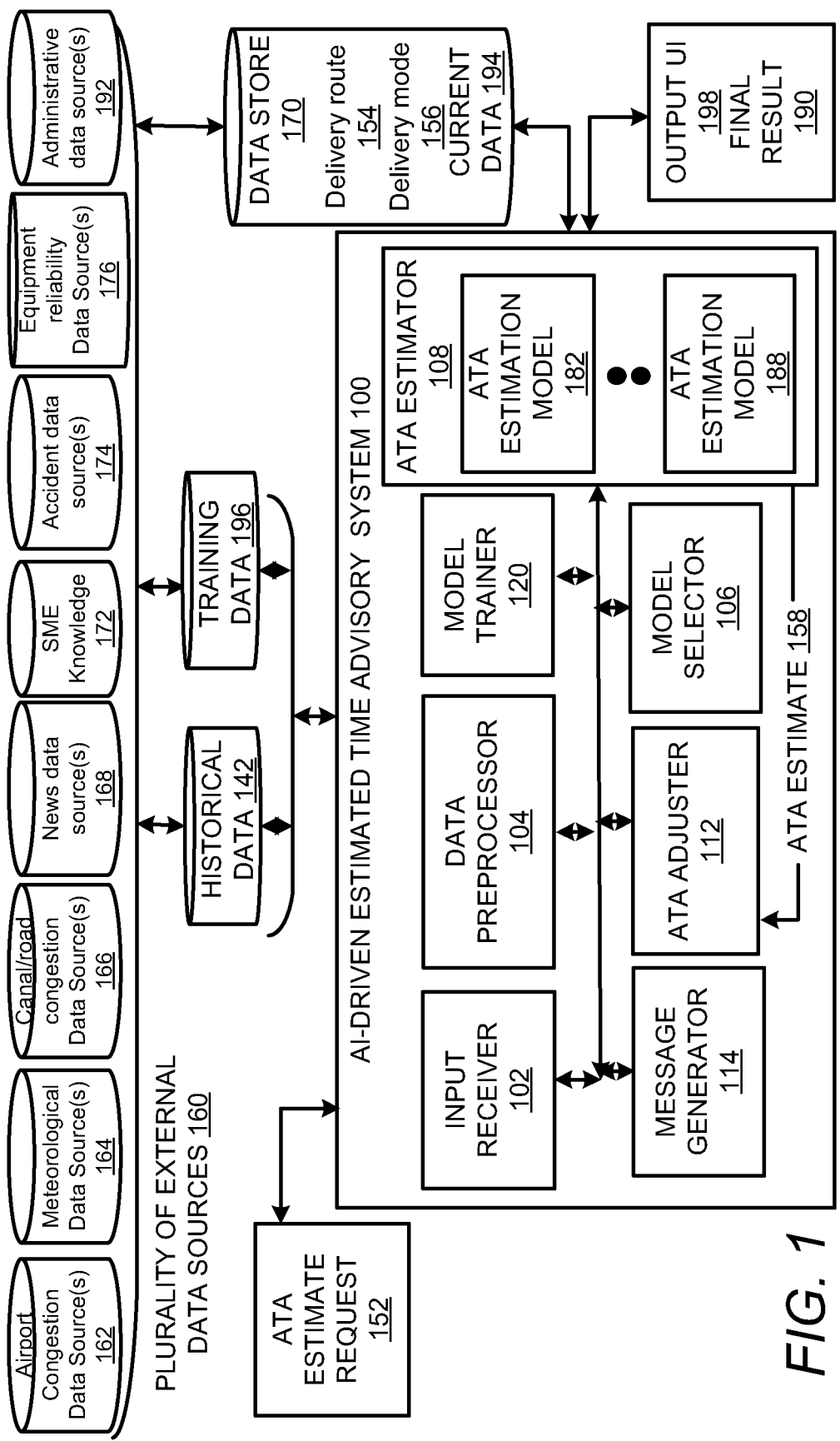
FIG. 1 shows a block diagram of an AI-based estimated time advisory system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based package/shipment delivery estimate system is disclosed. In various examples outlined below, the terms package and shipment are used interchangeably and it can be appreciated that the elements discussed are applicable to both a package and a shipment. The delivery estimate system employs a plurality of AI-based delivery estimation or ATA estimation models to generate ATA estimates for different delivery routes using different delivery modes or transport modes which can include land, sea, or air. The delivery estimates are generated based on data retrieved from a plurality of external data sources which can include public, private, or subscription-based data sources that provide at least traffic congestion feed, weather feed, accident data, a news feed, equipment reliability data, time taken for customs clearances and customer behavior. Historical data which includes one or more time-series data sets is retrieved from each of the plurality of external data sources. Time series data which may be also referred to as time-stamped data, is a sequence of data points collected at different points in time and indexed in time order. These data points represent successive measurements made from the same source over a time interval and are used to track changes over time. Each time series data set is transformed into categorical data, wherein the categorical variable takes values selected from a finite set that includes a plurality of risk levels. In an example, the plurality of risk levels can include a high-risk level, a medium-risk level, and a low-risk level.

Different data sources can include different types of data and therefore different methodologies can be implemented to convert the different types of data into categorical data. For example, regression techniques are applied to the time series data such as the weather data, the traffic congestion data, the accident data, etc. Initially, an upper control limit (UCL) and a lower control limit (LCL) are obtained for a given time series data set. The time series data points are compared with the UCL and the LCL to identify points that exceed the UCL or go below the LCL. These points can be identified as anomalies are extremities that can give rise to the risk of delaying the package delivery due to extreme weather/accident/congestion conditions. Therefore, the categorical variable takes a high-risk value for these points. Similarly, medium-risk or low-risk points can be identified based on a comparison of the data points with the average or mean of the data set. The categorical data thus generated from historical data is stored and used as training data for the plurality of ATA estimation models. In an example, each of the ATA estimation models can include a neural network of multiple layers with each layer including multiple nodes.

In the case of news data sources, news articles relevant to the delivery route, and the delivery mode are retrieved and initially processed for stemming, lemmatization, and stop word removal. The sentiments and the keywords are extracted from the news articles and are compared with an ontology linked to a cause-effect table. The matching sentiments and keywords are identified from the ontology and the corresponding severities of the causes are identified. The severities are matched to the corresponding risk levels i.e., the high-risk level, the medium-risk level, and the low-risk level. Textual data such as historical news articles are therefore transformed into categorical data that forms training data to the plurality of ATA estimation models.

The categorical data thus obtained is further converted into binary code and is used to train the plurality of ATA estimation models to produce ATA estimates for shipments/packages, even before the package is shipped. More particularly, historic data pertaining to a specific delivery route and the corresponding delivery mode is selected from the plurality of external data sources and provided to an ATA estimation model of the plurality of ATA estimation models for training the ATA estimation model in generating ATA estimates for that specific delivery route and the corresponding delivery mode.

A received ATA estimate request is initially analyzed to determine the attributes of the shipment or package such as but not limited to, the shipment ID, the source and destination of the shipment, the carrier, the delivery route, and the delivery mode. An ATA estimation model is selected from the plurality ATA estimation models based on the delivery route and the delivery mode. Current data pertaining to the delivery route and the delivery mode is extracted from the plurality of external data sources. The current data can include data that is updated to the plurality of external data sources for a predetermined time e.g., a week, a month, etc., immediately preceding the receipt date of the shipment or package. Again, the current data can include one or more time series data sets, which are transformed into corresponding categorical data sets. The categorical data sets are provided to the trained, selected ATA estimation model to obtain an ATA estimate even prior to the package being shipped.

The delivery estimate system disclosed herein improves computer systems by enabling them to generate delivery time estimates or ATA estimates considering various factors which include not only numerical data sets such as weather data, accident data, equipment reliability data, etc. but also data sets of other data types such as textual data so that factors such as political developments, new regulations, etc., can be accounted for when generating the delivery estimates. More particularly, the delivery estimate system applies AI-based NLP to classify the news articles into risks for shipment delivery based on geopolitical developments. The ontology enables mapping risk to textual data for specific delivery modes. Furthermore, the ontology may be connected to sources such as Wordnet® to automatically add new words. The delivery estimate system implements a classification of time series data taking into account multiple external (congestion, weather, global warming, accident) parameters impacting shipment delivery. Time series data is converted into categorical by use of a complex process involving rule-based, automatic data scanning. The delivery estimate system converts risk-related data into categories and teaches Artificial Neural Networks (ANNs) to generate ATA estimates on a unique combination of variables. Furthermore, the categorical data is converted into numeric data or binary data using techniques such as but not limited to one hot encoding. This is because many machine learning (ML) algorithms cannot operate on label data directly. They require all input variables and output variables to be numeric thereby requiring conversion of the categorical data by the delivery estimate system into binary data for use by the plurality of ATA estimation models.

Moreover, risk assessment is completed by the delivery estimate system before the shipment is connected to a tracking system. The delivery estimate system further implements a unique way to fragment routes into logical legs with each logical leg including a starting location and an ending location, extract & classify data related to the logical legs and enrich the data into information and knowledge, and stitches everything back together to obtain an ATA estimate for the delivery route. The delivery estimate system "advises" the "time" a shipment is supposed to take under various and finite risk constraints "before the shipment is in motion". The delivery estimate system is dependent on "current data" and not "live data" because this is an AI-based advisory system rather than a "tracking system". Historical and "current" risk-related data is used to assess risks (based on several external variables) and advise the transit time "whenever such an advice is sought"; provided, such advice is sought close to the actual, prospective connection date of the shipment to maintain the "currency" of the external data. As a result, the delivery estimate system does not need "live data" such as Global Positioning System (GPS) data or sensor data but operates merely by accessing current data from the plurality external of data sources.

FIG. 1 shows a block diagram of an AI-driven package delivery estimate system 100 in accordance with the examples disclosed herein. The delivery estimate system 100 includes an input receiver 102, a data preprocessor 104, a model selector 106, an ATA estimator 108, an ATA adjuster 112, and a message generator 114. The delivery estimate system 100 receives an ATA estimate request 152 with information related to a package to be delivered and generates an estimation of the delivery time or an ATA estimate 158. In an example, the ATA estimate request 152 can include an advanced shipment notification that is received for a shipment. The ATA estimate request 152 can be processed via string or natural language processing (NLP) techniques by the input receiver 102 to extract details such as but not limited to, a package pickup, a delivery route 154, and a delivery mode 156 which will be used for shipping the package. The delivery route 154 can depend on the delivery mode 156 selected for transporting the package. The delivery mode 156 can include a land transport mode, a sea mode, and an air mode while the delivery route 154 can include a starting point where the package is picked up and the destination for the package. In an example, the delivery route 154 can be analyzed as a collection of logical legs, wherein each logical leg can be characterized or identified by an intermediate source, and an intermediate destination along the delivery route 154 and wherein an intermediate destination of one logical leg may be the intermediate source of the next logical leg.

The delivery estimate system 100 is connected to a plurality of external data sources 160 to gather the information that is necessary to generate the ATA estimate 158. Each of the plurality of external data sources 160 can be independent of each other and may provide information related to one or more aspects that might affect the delivery of the package. The plurality of external data sources 160 can include but are not limited to port/airport congestion data source(s) 162, meteorological data source(s) 164 which may include long-term global weather pattern data source(s) calculating impact of global weather patterns on local weather at different places, canal/road congestion data source(s) 166, news data source(s) 168, knowledge of subject matter experts (SME) 172, accident data source(s) 174, equipment reliability data source(s) 176, administrative data sources 192 such as customs clearance data and customer behavior data, etc. Each of the external data sources 160 can provide data related to the corresponding vector or variable that signifies a risk factor that can affect the transportation of the package and is therefore used in generating the ATA estimate 158. The delivery estimate system 100 may also be connected to a local data store 170 to store data such as the data extracted from the ATA estimate request 152, the current data 194, etc., used during operations.

Different data sources from the plurality of external data sources 160 can be selected based on the information related to the package that is extracted from the ATA estimate request 152. Particularly, the information related to the intermediate sources and the intermediate destinations of the logical legs identified, along the delivery route 154 can be extracted as the current data 194 from the plurality of external data sources 160. The current data 194 extracted from the selected external data sources can include one or more time series data sets pertaining to one or more risk factors which are transformed into corresponding categorical variables. Categorical variables take label values rather than numeric values where the label values may be selected from a finite set of values. In an example, each categorical variable generated by the data preprocessor 104 can take a value that pertains to one of a plurality of risk levels associated with the risk factors such as, a high-risk level, a medium-risk level, and a low-risk level. Furthermore, the data preprocessor 104 can be configured to convert the enriched data 180 into binary data using, for example, one hot encoding technique.

Based at least on the delivery route 154 and the delivery mode 156, the model selector 106 can select one of the plurality of ATA estimation models 182, . . . 188 from the ATA estimator 108. In an example, each ATA estimation model can include a neural network that is trained to generate an ATA estimation for a given route and the corresponding mode. The binary data generated from the one hot encoding technique is provided to the trained, selected ATA estimation model to obtain the ATA estimate 158. It may be noted that the ATA estimate 158 thus obtained is generated almost entirely from currently available data without the need for live inputs from warehouse sensors or GPS devices used along the route. In an example, certain time series data such as the data pertaining to customs clearance data 182 can be initially treated to remove weekend/holiday noise. The ATA estimate 158 therefore, needs to be further refined by an ATA adjuster 112 to compensate for the removal of the weekend/holiday noise. In an example, the ATA adjuster 112 can employ an algorithm that calculates the number of weekends and holidays for specific regions along the delivery route 154. These weekends and holidays can be added to the ATA estimate 158 to produce a final result 190 by the message generator 114 which can be output via output user interfaces e.g., an output user interface (UI) 198 or may be transmitted as a message to concerned parties.

The delivery estimate system 100 also includes a model trainer 120 which is employed to train a plurality of ATA estimation models 182, . . . , 188, to generate ATA estimates corresponding to specific routes and therefore specific modes of delivery/transport. Accordingly, historical data 142 gathered from the plurality of external data sources 160 pertaining to a specific delivery route and the corresponding delivery mode of that delivery route can be employed to train one of the plurality of delivery time or ATA estimation models 182, . . . 188 to generate an ATA estimation for that particular delivery route in the corresponding delivery mode. Again, the historical data 142 is also preprocessed by the data preprocessor 104 to transform any historical time series data sets into corresponding categorical data sets, which are further converted into binary data before being used for training the plurality of ATA estimation models 182, . . . , 188.

Figure 2:
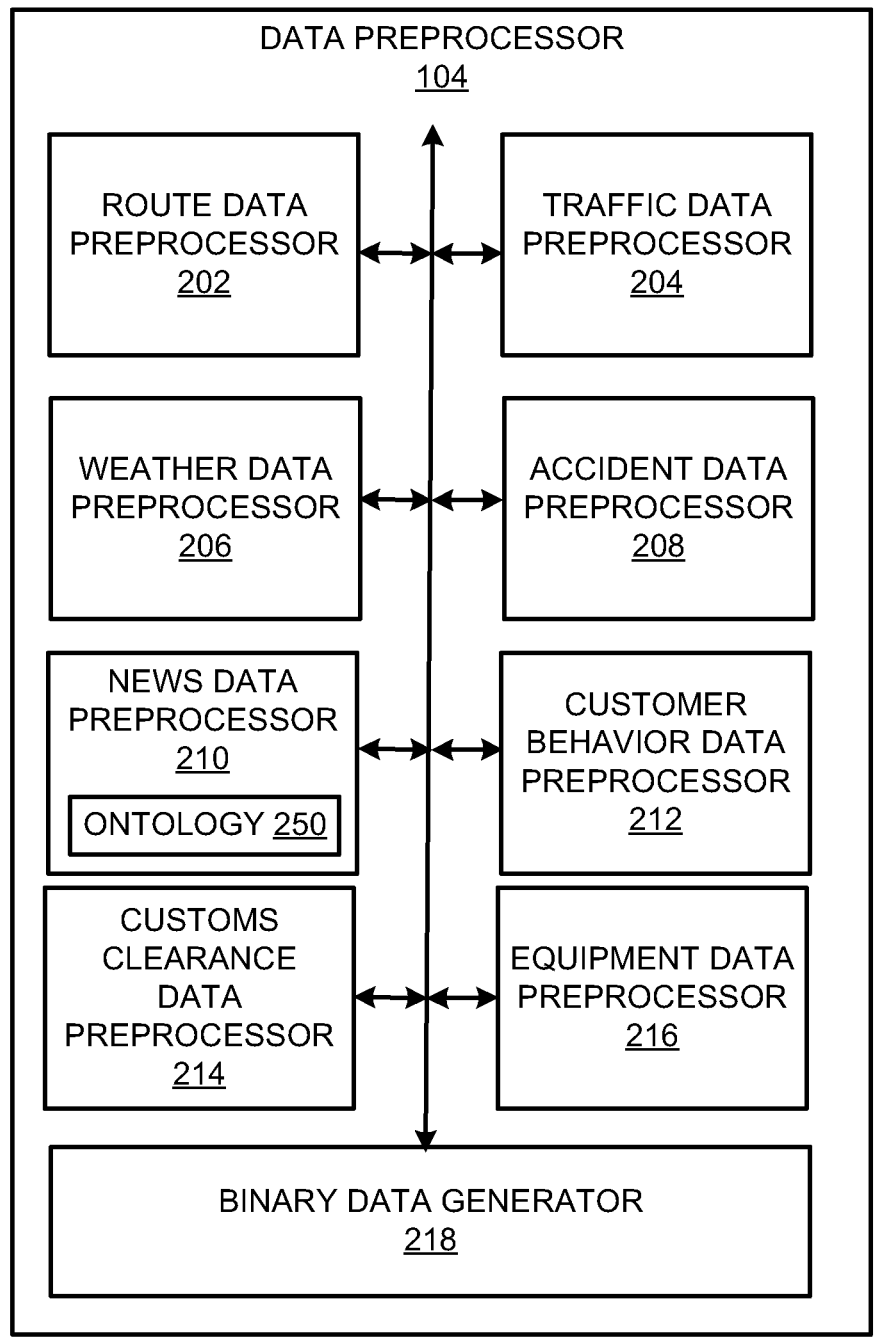
FIG. 2 shows a block diagram of a data preprocessor in accordance with the examples disclosed herein.

FIG. 2 shows a block diagram of the data preprocessor 104 in accordance with the examples disclosed herein. As mentioned above, the data preprocessor 104 accesses data including current data and historical data 142 from the plurality of external data sources 160 to convert the data into a format suitable for providing to the ATA estimation models. The data preprocessor 104 includes a route data preprocessor 202, a traffic data preprocessor 204, a weather data preprocessor 206, an accident data preprocessor 208, a news data preprocessor 210, a customer behavior data preprocessor 212, a customs clearance data preprocessor 214, and an equipment data preprocessor 216. Also, the data preprocessor 104 includes a binary data generator 218 that generates or converts to binary data, the data emitted by the various data preprocessors outlined above. Each of the data preprocessors accesses one of the current data 194 or the historical data 142 from the corresponding one of the plurality of external data sources 160 and converts the accessed data into a format suitable for training and/or analysis by the plurality of ATA estimation models 182, . . . , 188. In an example, the data preprocessor 104 can also convert miscellaneous data obtained from the ATA estimate request 152 such as shipment ID, delivery route 154, the source and destination, the delivery mode 156, the carrier, etc. Among the data fields extracted from the ATA estimate request 152, the shipment ID can be of alphanumeric data type however, the remaining data pieces including the source and destination, the delivery mode 156, the carrier, etc., are categorical variables that are converted into binary data by the binary data generator 218 using techniques such as One Hot encoding.

Each of the different preprocessors in the data preprocessor 104 process data for the various delivery routes by logically dividing each of the delivery routes into logical units referred to as logical legs. Different routes may have common logical legs and therefore analyzing or processing the data in terms of logical legs leads to more efficient processing. The route data preprocessor 202 can access for a given risk factor, the risk ratings associated with each of the logical legs that make up the particular delivery route. The highest risk rating of any of the constituent logical legs is applied as the risk rating of the delivery route. The traffic data preprocessor 204 can access via mechanisms such as Really Simple Syndication (RSS) feeds, Javascript Notation Object (JSON), or via Application Programming Interfaces (APIs) updates to traffic at various ports/airports. The rule-based pattern analysis is applied to the enriched traffic data to determine a risk rating for the traffic vector. In an example, the pattern analysis can include analyzing traffic data using statistical models such as but not limited to regression to obtain the risk rating for the traffic risk factor. The accident data preprocessor 208 can access accident data source(s) 174, via, for example, API to retrieve current accident data along with a logical leg for analysis by statistical models e.g., regression thereby generating a risk rating for the accident risk factor in a methodology as outlined above.

In an example, the customer behavior pertaining to receiving packages/shipments can be quantified into a calculated numeric value by the customer behavior data preprocessor 212 for customer behavior data in the historical data 142 and the current data 194. Some customers or consignees may request that the delivery of shipment be delayed or may not receive the shipment when the shipment arrives at a warehouse. Such customer receiving behavior can be indicated by the corresponding numeric values which are used in training the plurality of ATA estimation models 182, . . . , 188 to generate the ATA estimates using the customer behavior data values obtained in the current data 194. The data such as but not limited to Weibull statistics including the mean time to repair (MTTR) and mean time to failure (MTTF) plotted against the repairs done on the transport equipment including vehicles used to transport the packages, the package handling machinery (e.g., lifts/cranes in warehouses), etc., can be obtained from the equipment reliability data sources(s) 176 for analysis by the equipment data preprocessor 216 to generate a risk rating that provides the likelihood of the package being delayed due to equipment failure is estimated. The news data preprocessor 210 employs natural language parsing (NLP) techniques to determine the risk of delay to the package/shipment delivery due to various situations which can include geopolitical situations, weather vagaries, accidents along the delivery route, etc. The news data preprocessor 210 includes an ontology 250 which may further include mode-specific ontologies e.g., an ontology pertaining to each of the air, sea, and land modes for determining risk as detailed further herein.

Similarly, other corresponding data preprocessors may operate in accordance with the procedures detailed below to generate risk ratings for different risk factors associated with the logical legs of a given route using a given mode. For each risk factor, the corresponding data preprocessor can output a risk rating for a given logical leg. The outputs from each of the different data preprocessors are converted by the binary data generator 218 into binary code to be provided to the selected ATA estimation model.

Figure 3:
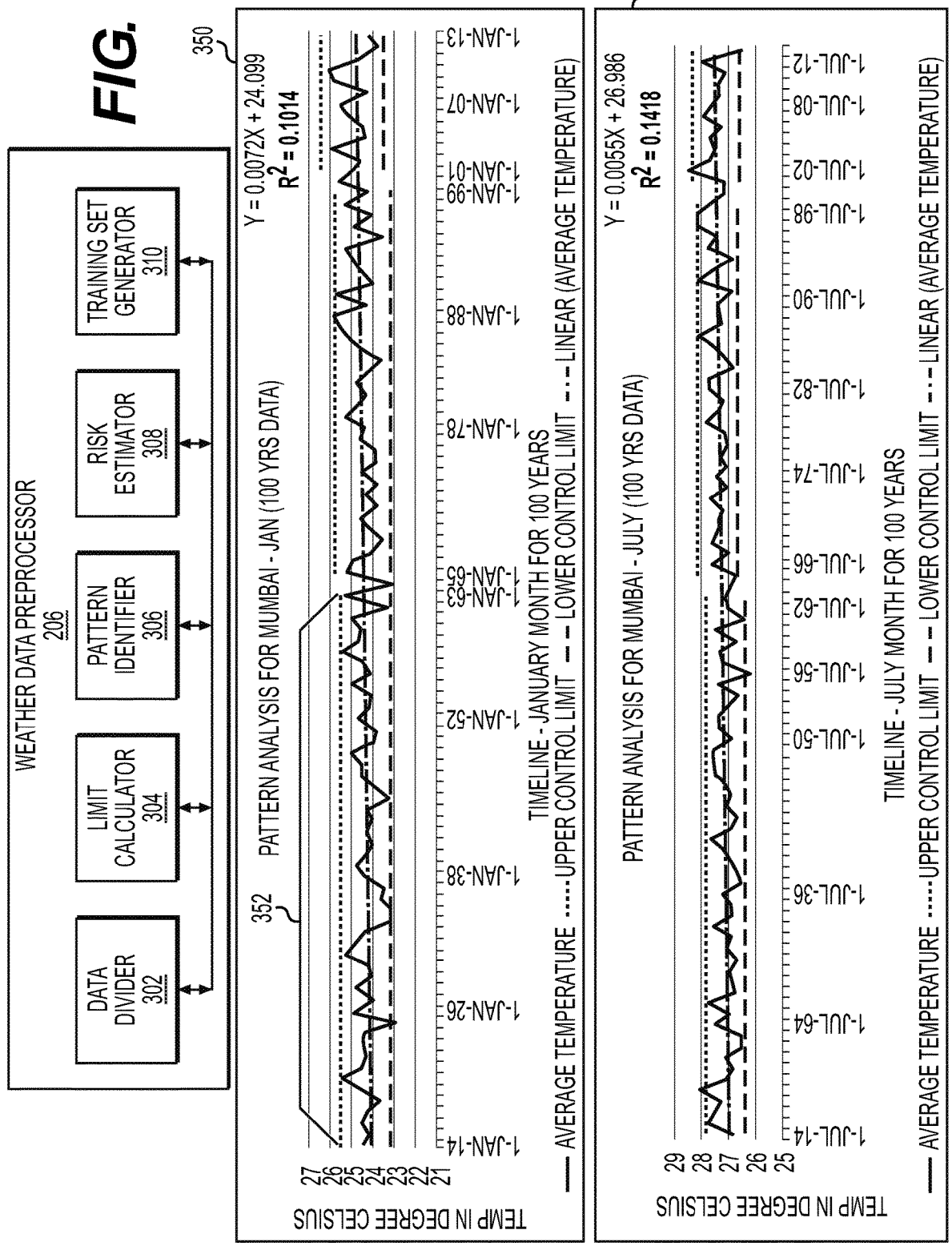
FIG. 3 shows a block diagram of a weather data preprocessor in accordance with the examples disclosed herein.

FIG. 3 shows a block diagram of the weather data preprocessor 206 in accordance with the examples disclosed herein. The weather data preprocessor 206 can be configured to preprocess weather data feed from the meteorological data sources 164 which include short-term weather data and long-term global weather trends. The weather data preprocessor 206 includes a data divider 302, a limit calculator 304, a pattern identifier 306, a risk estimator 308, and a training set generator 310. The data divider 302 initially accesses historical data 142 and divides the data into time ranges to facilitate the calculation of limits. For example, the timelines 350 and 360 plot historical temperatures in Mumbai for 100 years for January and July respectively. The data divider 302 can initially divide the data into predetermined time ranges, e.g., 60-year blocks as shown at 352. The limit calculator 304 receives the divided data and calculates an upper control limit (UCL) and a lower control limit (LCL). The timeline 350 can be generated using the formula:

$$y=0.0072x+24.099 \quad \text{Eq. (1)}$$

Similarly, timeline 360 is generated using the formula:

$$y=0.0055x+26.986 \quad \text{Eq. (2)}$$

The average or mean temperatures are obtained for the timelines and the UCLs and the LCLs are placed at $2\sigma$ from mean to cover 95% data points, wherein $\sigma$ is the standard deviation for the data set.

The pattern identifier 306 tracks the data between the UCL and the LCL and identifies the points where the temperatures vary greater than a predetermined amount from the average temperature. These points of temperature variation and the magnitude of temperature variation from the average temperature are provided to the risk estimator 308. The risk estimator 308 outputs one of a high-risk, a low-risk, or a medium-risk based on the position of the temperature data point between one of the limits and the average temperature. If temperature, in recent years, hovers consistently within the control limits, then it is estimated that the particular month or period, with respect to the given region, may pose low to medium risk (depending on the polarity of the general deviation [of the data] from the mean) to shipments passing through the said region (for which the analysis is being performed) at that time. Alternatively, if the time series weather pattern suggests that for the same given month or period, with respect to the given region, data points are consistently close to or exceeding the UCL then there may be a high risk posed to shipments passing through the region during that month/period. Thus, the time series data pertaining to the weather is converted into a categorical variable that enables determining the ATA estimate 158. In an example wherein the historical data 142 is converted to categorical data, the converted categorical data is provided as training data 196 to train the plurality of ATA estimation models 182, . . . , 188 for ATA estimation generation. In an example, wherein the current data 194 is processed by the weather data preprocessor 206, the current weather data is selected for locations based on the delivery route 154 and the delivery mode. The current weather data is processed to generate the corresponding risk ratings which are supplied to the selected ATA estimation model along with the current weather data for the generation of the ATA estimate 158.

Referring to timeline 350, the best-fit Regression formula has a narrow slope which indicates that the temperature rise is not sharp in January for Mumbai. It can be observed from timeline 350 that less than 5% of the monthly average temperature in January have crossed UCL in the last 50 years. This makes sense because control limits are placed at $2\sigma$ from mean thereby covering 95% of data points. Furthermore, it can be observed that the temperature has not crossed the UCL this century in January. Therefore, it can be concluded that there is no risk of erratic or sharp temperature changes in Mumbai for January.

Referring to timeline 360, the best-fit Regression formula has a narrow slope indicating that the temperature rise is not sharp in July for Mumbai. Greater than 5% i.e., nearly 14% have crossed the limits, where about 8% of the monthly average. the temperature in July has crossed UCL in the last 50 years. All these events took place towards the last quartile of the twentieth century during the accelerated global warming period. During the current century, the average year temperature crossed the UCL and LCL twice. From the data described above, it can be concluded that Mumbai experiences unpredictable weather patterns during the monsoon season thereby leading to a greater risk rating during July as compared to January.

Similar pattern analysis as described above can also be employed by the traffic data preprocessor 204, the accident data preprocessor 208, and the equipment data preprocessor 216 to analyze the port/airport/canal congestion data, accident data, etc., to convert these time series data sets to categorical data. The training set generator 310 can store the various temperatures and the associated risk levels during different seasons to train the plurality of ATA estimation models 182, . . . , 188 to generate the ATA estimates accordingly.

Figure 4:
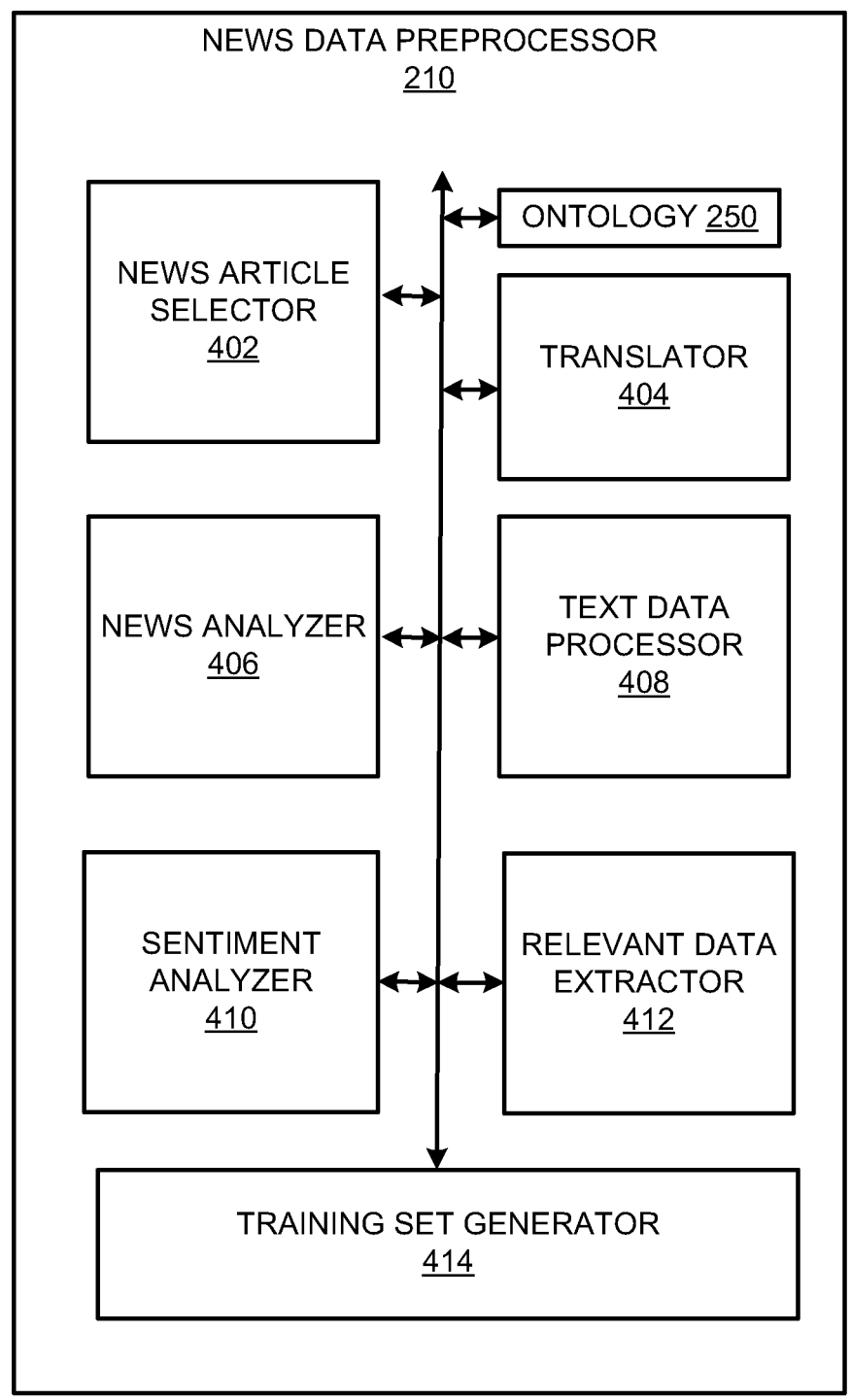
FIG. 4 shows a block diagram of a news data preprocessor in accordance with the examples disclosed herein.

FIG. 4 shows a block diagram of the news data preprocessor 210 in accordance with the examples disclosed herein. The news data preprocessor 210 includes a news article selector 402, a translator 404, a news analyzer 406, a text data processor 408, a sentiment analyzer 410, a relevant data extractor 412, and the training set generator 414. The news article selector 402 selects news articles from the news data sources 168 based on the delivery route 154 and the delivery mode 156 by using API or scrapping techniques. It may be appreciated that while news data sources 168 need not include only political news sources but may also include weather news sources, domain-specific news sources (e.g., news sources providing updates regarding government regulation), local news sources, etc.

More particularly, the news articles associated with the various places, or locations along the delivery route 154 can be retrieved per leg. If required, the news articles may be translated by the translator 404 into a different language than the language of their publication. The news article is classified by the news analyzer 406 based on the travel/delivery modes affected by the content of the news article. For an example, news data preprocessor 210 can include a data storage structure such as an ontology 250 that includes columns for the modes affected by the article, the cause, and the timing (e.g., start date and end date) associated with the effect. The ontology 250 can further include, for each cause, a plurality of classification levels that can cause the news article/cause extracted from the news article to be classified into one of the plurality of classification levels based on the severity of the effect of the cause on the delivery time estimate. Accordingly, each cause can be associated with a severity ranking. For example, the ontology 250 can be regularly updated via connections to external databases such as WordNet®.

The news articles are then processed by the text data processor 408 for text stemming and lemmatization. Furthermore, the text data processor 408 can be configured to remove stop words from the text extracted from the news articles. Tools such as koRpus package in R or Textstem package in R can be used by the text data processor 408.

The sentiments in the text are extracted by the sentiment analyzer 410. An example of text processing executed by the news data preprocessor 210 will be discussed herein by way of illustration and not limitation. Given below is a sample text from an article to be analyzed:

"India's major container ports are facing severe congestion as import containers are stacking up amid the 21-day nationwide lockdown to combat the spread of coronavirus. The Container Freight Stations Association of India (CFSAI) has warned that its member units in Jawaharlal Nehru Port Trust (JNPT), Mundra, Pipavav, and Hazira have been removing import laden boxes that are not being cleared by importers from all terminals to nearby container freight stations (CFS)."

The original text reproduced above includes "articles" "prepositions" and punctuations which can lead the ML components such as the NLP parsers to erroneous results while adding little value. Some stop words are removed after stemming and lemmatization. Thereafter, some qualifiers, adjectives, and comparatives like "extreme", "any", "ideal", practical, actual, "further", "very", "little", "much", "further" etc. are also removed as these words would unduly influence the analysis/comparison with the ontology 250. Verbs like "make", "have" are important for analysis. For example, the passage reproduced above includes a negative term "not being cleared" which will be analyzed infra for negative sentiments. Therefore, cleaned text but without negative sentiment analysis can be obtained as:

"India container ports face congest import container stack up amid 21 day nationwide lockdown combat spread coronavirus Container Freight Stations Association India CFSAI warn member unit Jawaharlal Nehru Port Trust JNPT Mundra Pipavav Hazira have remove import laden box that not clear importer from all terminal nearby container freight station CFS"

The cleaned text further processed for keyword extraction provides a collection of keywords, phrases, or expressions as shown below:

"india container port face congest import stack up amid 21 day nationwide lockdown combat spread coronavirus freight station association cfsai warn member unit jawaharlal nehru trust jnpt mundra pipavav hazira have remove import laden box importer from terminal nearby station cfa"

Words indicating negations such as without", "no", "not" are important words since in combination with certain other words they indicate dangers/risks thereby increasing severity—e.g., "without peace", "no respite", "not any break" or "not break", "no deal", "no progress", etc. The words "peace", respite, "break", "deal", etc. are placed in the exceptions list of sentiment analysis. Every negative word such as but not limited to, no, not, without, etc. has its exceptions list although there may be overlaps. While, with other words, these "negative words" may portray a false impression of danger/risk, combinations of "negative words" and words in the exceptions list are considered as "expressions" where an expression can be treated by the delivery estimate system 100 as a single word. Finally, the list of keywords ready to be compared to the ontology can be given as: "india, container, port, face, congest, import, stack up, amid, 21, day, nationwide, lockdown, combat, spread, coronavirus, freight, station, association, cfsai, warn, member, unit, Jawaharlal, Nehru, trust, jnpt, mundra, pipavav, hazira, have remove, import, laden, box, importer, from terminal, nearby, cfs".

The processed text which can include keywords or phrases as described above is provided to the relevant data extractor 412 to identify relevant data based on a comparison with the ontology 250. The relevant data extractor 412 can employ text-matching techniques to identify various pieces of information from the processed text of each news article. The various pieces of information can include the relevant routes, the relevant delivery modes, the specific logical legs, the causes that match with those in ontology 250, and the severity rank of the cause as extracted from ontology 250. One of the plurality of risk levels can be assigned, which is directly proportional to the severity rank. The news article along with the severity rank and the risk level is incorporated into the training data set by the training set generator 414.

When the current data 194 is also processed by the news data preprocessor 210 as detailed above wherein the news article selector 402 selects current news articles from the news data sources 168, which are translated if necessary and classified by the news analyzer 406 based on comparisons with the ontology 250. The text of the news articles is processed for keyword extraction and for sentiment identification. The severity rank and the risk level are identified and provided to the selected ATA estimation model for the generation of the ATA estimate 158.

Figure 5:
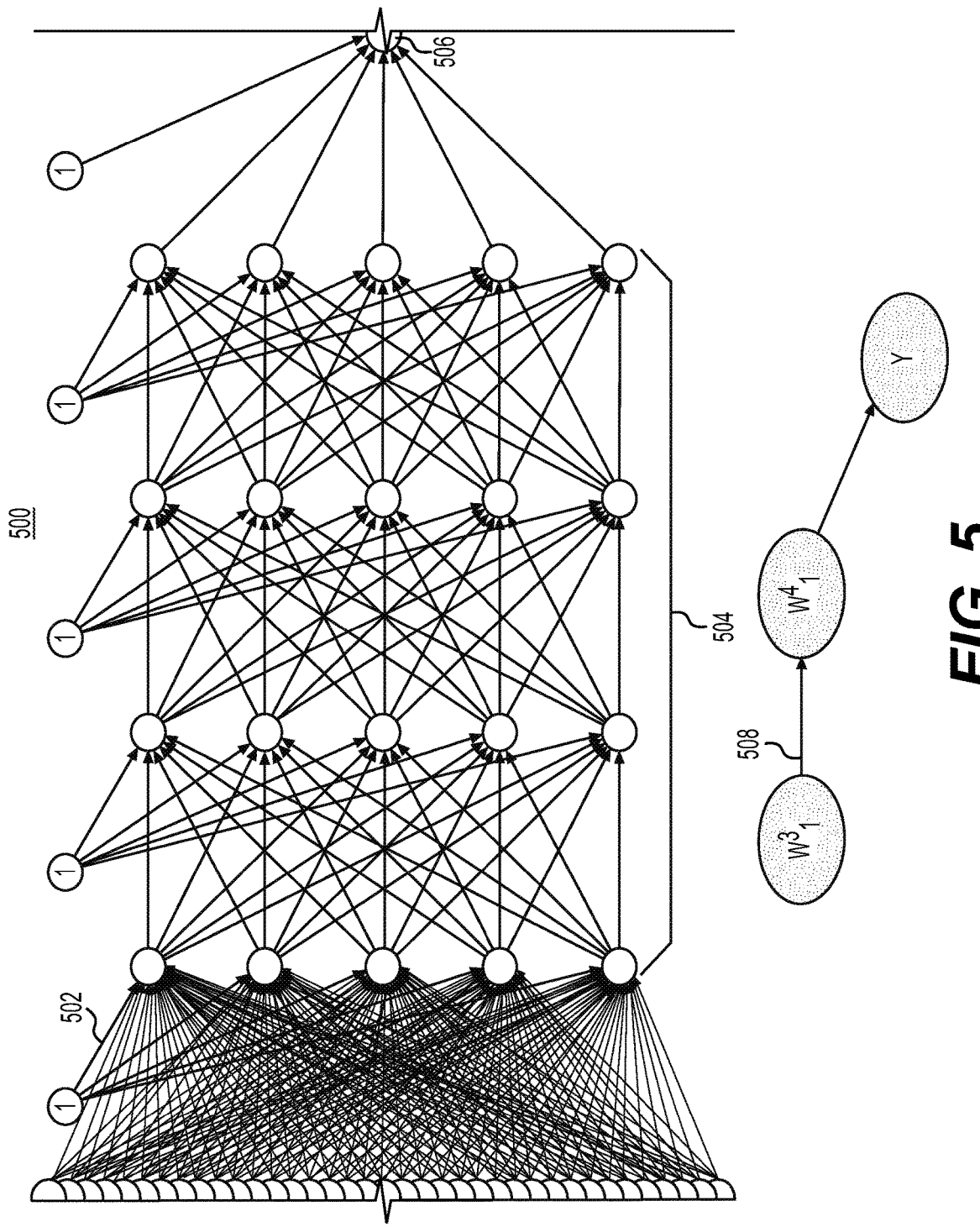
FIG. 5 shows a schematic diagram of a neural network that can be used in Actual Time of Arrival (ATA) estimation models in accordance with the examples disclosed herein.

FIG. 5 shows a diagram of a neural network 500 that can be included in each of the plurality of ATA estimation models in accordance with the examples disclosed herein. It may be appreciated that the details of the neural network 500 are discussed herein by way of illustration and that other neural networks can be employed for ATA estimations in accordance with other examples. The neural network 500 includes one input layer 502, four hidden layers 504 with five nodes per layer, and one output layer 506. The number of hidden layers can be determined by $2\sqrt{n}$ (where n=> number of covariates/independent variables). For 38 covariates, recommended layers is ≅6. However, upon further optimization, it was determined that the neural network 500 gave a better performance at 4 hidden layers. The cost function for the neural network 500 is:

$$\partial C/\partial \omega \text{ or } \partial C/\partial b \qquad \text{Eq. (2)}$$

C=> Cost Function with respect to any weight ω or any bias b where, $$C = \frac{1}{2n}\sum_k \|y - a^L(x)\|^2 \text{(the sum is over individual training examples),} \qquad \text{Eq. (3)}$$

n=> total number of training examples,
y=> desired output=>f (x),
L=> number of layers in the network and
$a^L(x)=a^L=$> vector of activations output from the network when x is input.
$a^L$ is in vectorized form and therefore considers each input variable $x_i$
e.g. c(1, 0, 0, 0, 0.33, 0, 1, 0.45) [here each element of the vector presents a value of $x_i$]

The neural network 500 was initialized by a random distribution of weights and biases which are further optimized as detailed below wherein:

$\omega_{jk}^l$=> Weight (for the connection) from the $k^{th}$ neuron in $(l-1)^{th}$ layer as indicated at 508 to $j^{th}$ neuron in lth layer and $a_j^l$ & $z_j^l$ are determined from Eqs. 4 & 5 respectively:

$a_j^l=\sigma(\Sigma_k\omega_{jk}^l a_k^{l-1}+b_j^l)$=> activation of $j^{th}$ neuron in lth layer  Eq. (4)

Where, $z_j^l=\Sigma_k\omega_{jk}^l a_k^{l-1}+b_j^l$=> Weighted input to a neuron  Eq. (5)

$\omega_{jk}^l$ was tweaked till Eq. 6 was satisfied, $$\delta_j^l = \frac{\partial C}{\partial z_j^l} = > \text{Partial derivative of error function} \qquad \text{Eq. (6)}$$

Where, $\Delta z_j^l$ represents error at each node. This process was continued for each node to the node connection. Once convergence was achieved for all the y values, the 'y' value curve was smoothened by the equation:

$$\tanh(y) = \frac{e^{2x} - 1}{e^{2x} + 1} \qquad \text{Eq. (6)}$$

The convergence of weights and biases is given as:
File (Weight Distribution Across Layers) shows how converged weights were distributed across:
Input Layer→Hidden Layer 1→Hidden Layer 2→Hidden Layer 3→Hidden Layer 4→Output Layer. This is achieved by the formula given by:

ata_norm~carrier+(Source↔Destination)+Customs risk (categorical)+Season/Month (categorical)+Route (categorical)+Customer Delay (normalized)+News risk/geo-political impact (categorical)+Port Congestion Risk (categorical)+Met department data (categorical) where,
ata_norm=> Normalized form of Actual Time of Arrival.

Figure 6:
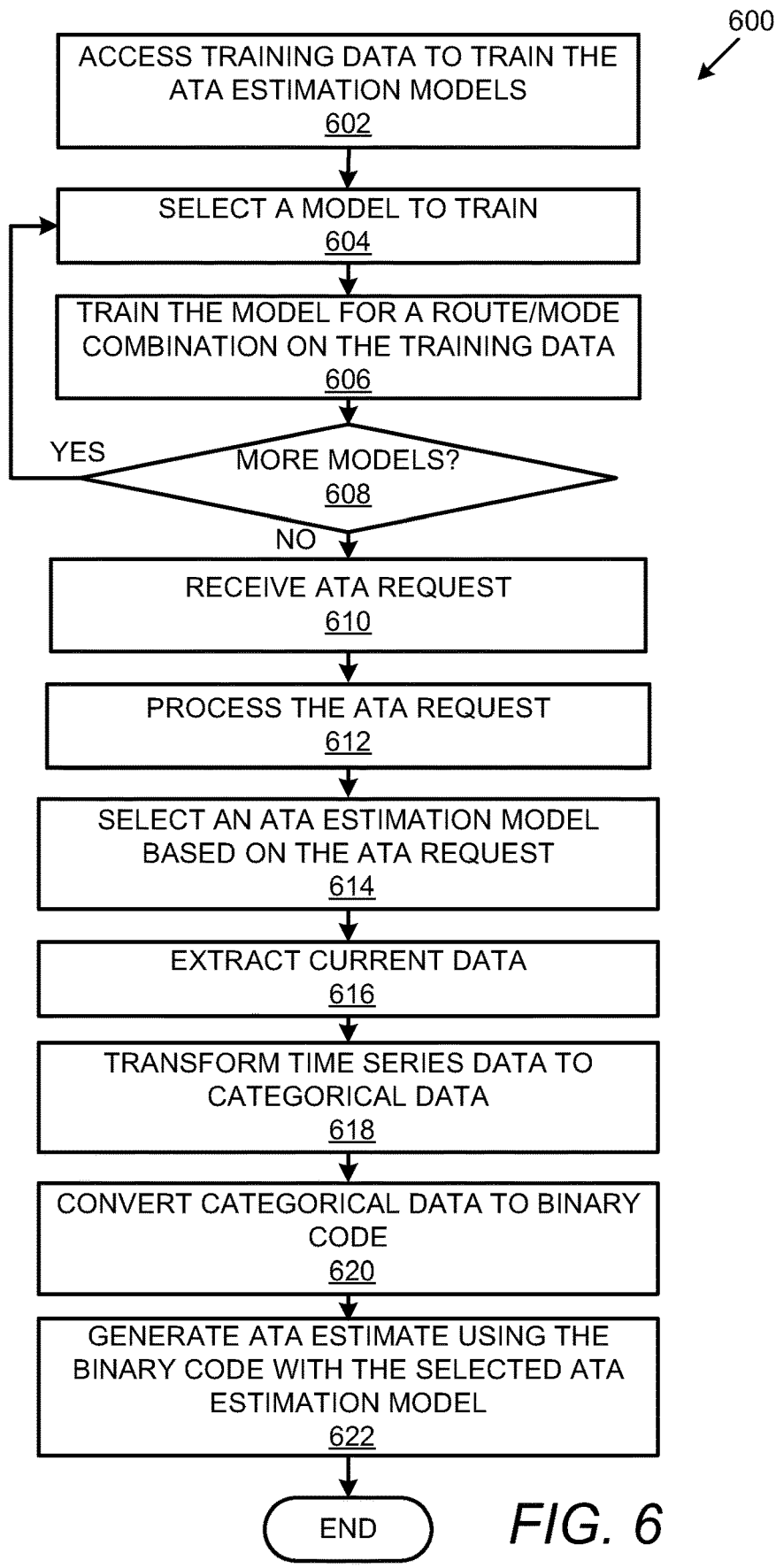
FIG. 6 shows a flowchart that details a method of obtaining a delivery time or an ATA estimate in accordance with the examples disclosed herein.

FIG. 6 shows a flowchart 600 that details a method of obtaining an ATA estimate in accordance with the examples disclosed herein. The method begins at 602 wherein the training data 196 to train the plurality of ATA estimation models 182, . . . , 188, is accessed. Each ATA estimation model includes a neural network that is trained to generate an ATA estimate for a given route using a specific delivery or transport mode. The training data 196 is generated from the historical data 142 gathered from the plurality of external data sources 160 and preprocessed for conversion to categorical data. One of the plurality of ATA estimation models 182, . . . , 188, is selected at 604 and trained at 606 on the portion of the training data 196 pertaining to a specific delivery route and the corresponding delivery mode to generate an ATA estimate for that particular delivery route and mode. At 608, it is determined if further ATA estimation models remain to be trained. If it is determined that further ATA estimation models remain to be trained, the method returns to 604 to select the next ATA estimation model else the method proceeds to 610 to receive the ATA estimate request 152. Although the training of the plurality of ATA estimation models 182, . . . , 188, is depicted herein as occurring serially for illustration purposes, it can be appreciated that the plurality of ATA estimation models 182, . . . , 188, can be trained in parallel simultaneously with the corresponding portions of the training data 196.

The ATA estimate request 152 is processed at 612 by NLP and string matching techniques to extract the package information such as the shipment ID, the carrier details, the shipment details such as the contents of the shipment, the weight of the package, handling instructions, the delivery route 154 and the delivery mode 156. It may be noted that the delivery route 154 and the delivery mode 156 details need not necessarily be extracted directly from the ATA estimate request 152 but may also be extracted based on the shipment/carrier details from one of the plurality of external data sources 160 or an internal reference table stored within the delivery estimate system 100. The delivery route 154 and the delivery mode 156 are used to select at 614, one of the plurality of ATA estimation models 182, . . . , 188 for the generation of the ATA estimate. Based at least on the shipment details, the delivery route 154, and the delivery mode 156, the current data 194 is extracted at 616 from one or more of the plurality of external data sources 160. The current data 194 can include data that has been updated to one or more of the plurality of external data sources 160 for a preceding predetermined time period (e.g., a week, a fortnight or a month, etc., that immediately precedes the date that the package was received or the date the ATA estimate request 152 was received). Accordingly, the current port or airport congestion data, the current weather conditions along the delivery route, the source-destination pass through volatility (i.e., the volatility along the delivery route), the current accident data, the current congestion conditions along the canals, and/or roads, the current global weather trend influences, the current reliability data of the equipment (ships, airplanes or other vehicles) used to transport the package, the customs clearance data and the customer behavior data is collected. The current data 194 is preprocessed 618 to transform the time series data sets into categorical data sets. The categorical data sets are converted into binary code at 620 using techniques such as one hot encoding. The selected ATA estimation model processes binary code to generate the ATA estimate at 622. In an example, the selected ATA estimation model can generate a normalized ATA for the package along the current delivery route via the current delivery mode, the normalized ATA is calculated based on an aggregated risk obtained by aggregating customs risk, news risk, port congestion risk, weather risk, customer behavior risk, etc.

Figure 7:
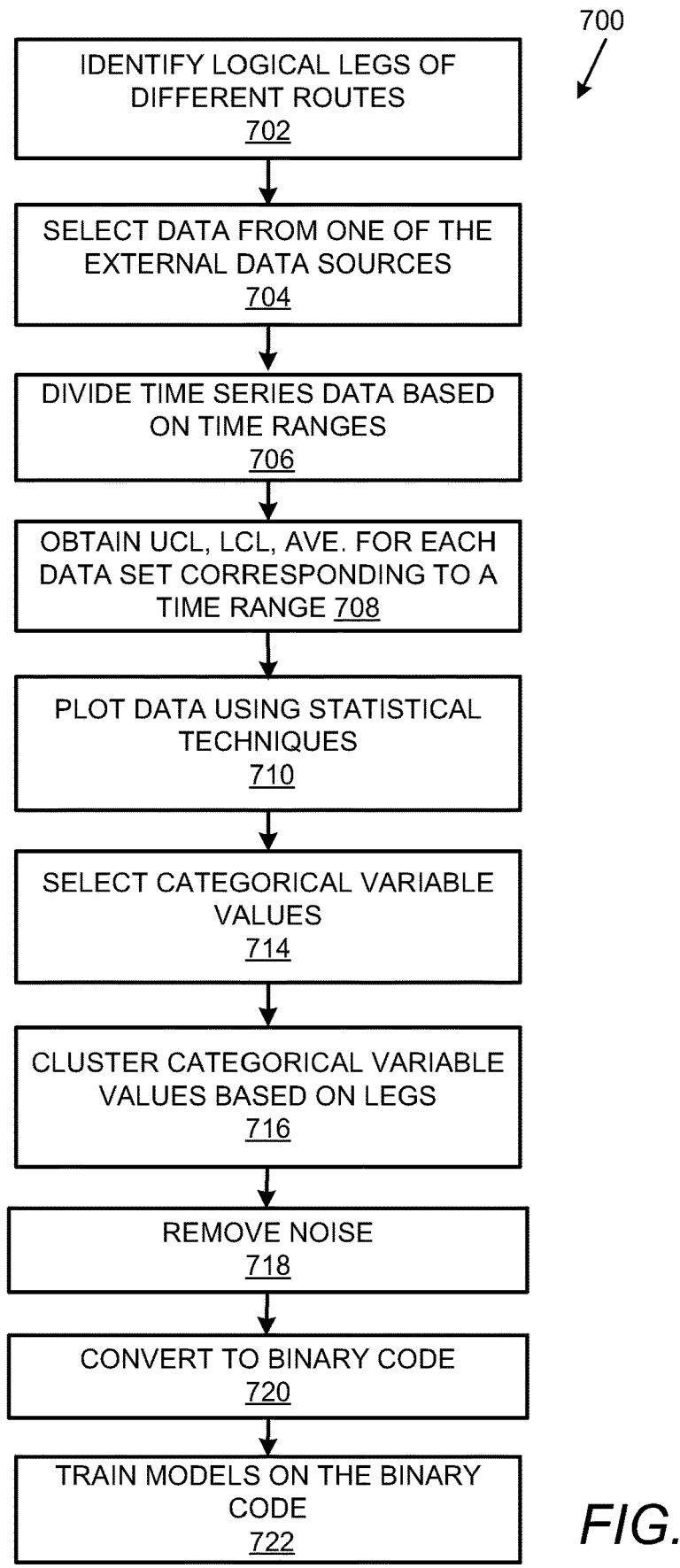
FIG. 7 shows a flowchart that details a method of generating training data for the plurality of ATA estimation models in accordance with the examples disclosed herein.

FIG. 7 shows a flowchart 700 that details a method of generating training data sets b for the plurality of ATA estimation models by transforming the time series data sets into categorical data in accordance with the examples disclosed herein. The method begins at 702 wherein the logical legs of the different routes are identified. At 704, data from one of the plurality of external data sources 160 including time series data sets are selected for training data generation. The time series data sets are divided at 706 based on the time ranges. Each data set corresponding to a time range is processed at 708 to calculate different values such as UCL, LCL, the average, etc. for the data set. Again, for each time period within the time range, the data is plotted at 710 using statistical techniques such as regression. The plotted data for each time range is compared to the UCL, LCL, and the average at 712 obtained for the time series data set. The categorical variable values for each time period are selected at 714 as one of the high-risk rating or level, medium-risk, or low-risk. The categorical variable values thus generated are clustered using a clustering algorithm such as K-means clustering at 716 based on the logical legs identified from the delivery routes. At 718 noise such as holidays or weekends is removed and the data sets are converted into binary code at 720 using techniques such as one hot encoding. The binary code corresponding to legs of a specific route and a particular mode are provided to the corresponding ATA estimation model of the plurality of ATA estimation models 182, . . . , 188, at 722 for training purposes. The description provided herein relates to the processing of data from one of the plurality of external data sources 160. Similarly, data from each of the plurality of external data sources 160 can be processed for transformation to categorical data which is provided for training to the corresponding ATA estimation models.

Figure 8A:
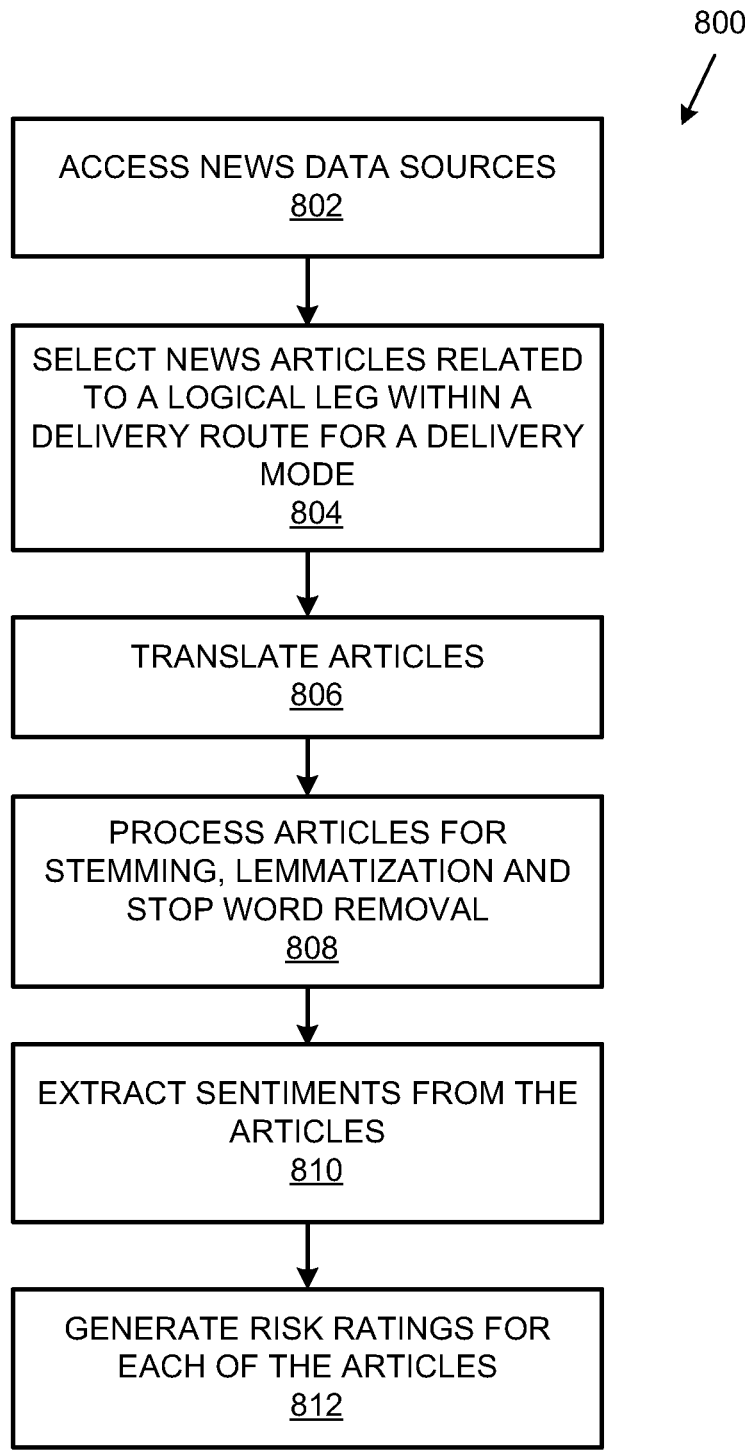
FIG. 8A shows a flowchart that details a method of processing data obtained from the news of data sources in accordance with examples disclosed herein.

FIG. 8A shows a flowchart 800 that details a method of processing one or more of the current data 194 and the historical data 142 obtained from the news of data sources 168 in accordance with examples disclosed herein. The method begins at 802 with the delivery estimate system 100 accessing the news data sources 168. At 804, news articles related to a logical leg within a delivery route for a given delivery mode are selected using API and/or scrapping techniques. The selected articles are translated if necessary at 806. Step 806 may be optionally executed depending on the language of the articles. At 808, the articles are processed for stemming, lemmatization, and stop word removal. At 810, the articles are processed for sentiment analysis. Different sentiment APIs can be employed for extracting positive or negative sentiments in the articles towards the issues discussed therein. The risk rating associated with each of the articles is generated at 812. If the historical data 142 is being processed, then the articles along with the risk ratings are integrated into the training data 196. If the articles from current data 194 are being processed, the articles, along with the risk ratings/levels are provided to the selected, trained ATA estimation model for the generation of the ATA estimate 158.

Figure 8B:
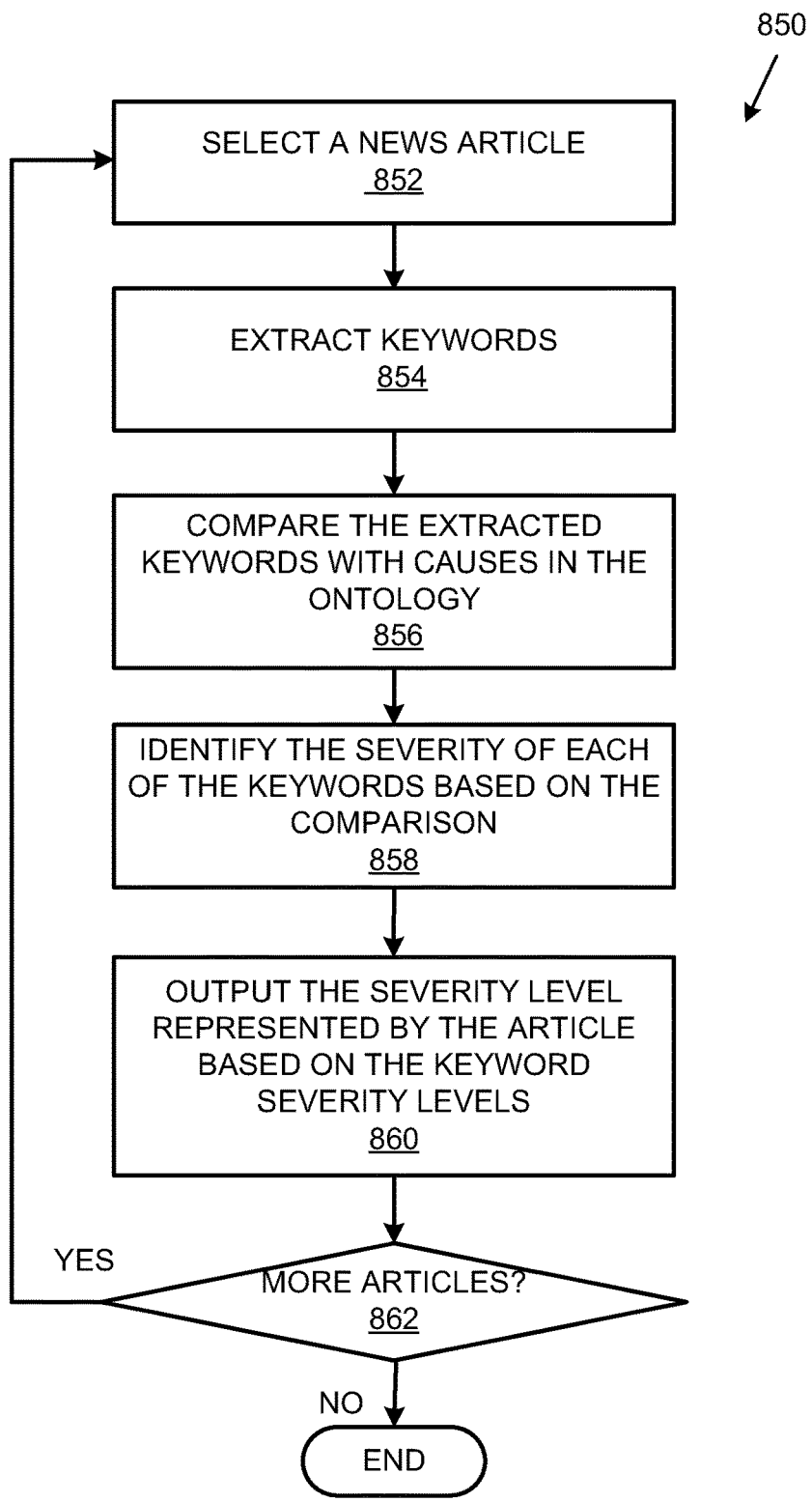
FIG. 8B shows a flowchart that details a method of determining a risk rating for a news article in accordance with examples disclosed herein.

FIG. 8B shows a flowchart 850 that details a method of determining a risk rating for a news article in accordance with examples disclosed herein. The method begins at 852 wherein one of the news articles is selected for determining the risk rating. The keywords are extracted from the selected news article at 854 using different machine learning algorithms and techniques that can be used to extract the most relevant keywords in a text, such as but not limited to, Support Vector Machines (SVM) and deep learning. The extracted keywords can include not only single words but also groups of words that may form phrases. The extracted keywords are compared to the keywords the ontology 250 at 856 to identify the severity level at 858 associated with the news article. Ontology 250 can include a mode-specific section with a listing of various causes for delays along a given delivery route for a specific delivery mode. Each of the causes can be mapped to keywords that are further mapped to a corresponding severity level. The severity level of a keyword can be identified based on a string comparison (or other keyword comparison techniques) of the keyword with the causes in the mode-specific section of ontology 250.

The severity ratings or severity levels can be indicative of the impact that the cause can have on the delivery of the package. The higher impact can imply greater delay and conversely lower impact implies lesser delay on the package delivery. In an example, the severity levels can range from −1, 0, +1 so that a lower number indicates higher severity. Hence, a cause with a '−1' impact is taken as the most severe. It can be appreciated that the specific numbers for the severity levels are discussed herein by way of illustration and that other rating schemes can be implemented for indicating severity levels in accordance with the examples. Different selection schemes can be implemented for determining the severity level of the news article. In an example, the highest severity level identified from the severity levels of the various keywords can be output at 860 as the severity level associated with the news article. In an example, a median severity level can be selected from the severity levels of the various keywords and can be output at 860 as the severity level associated with the news article. At 862, it is determined if more news articles remain to be processed. If yes, the method returns to 852 to select the next article for processing else the method terminates on the end block. Again, it can be appreciated that the serial processing of news articles is discussed herein for illustration purposes only and that the news articles can be processed simultaneously in parallel for determining the severity levels.

Figure 9:
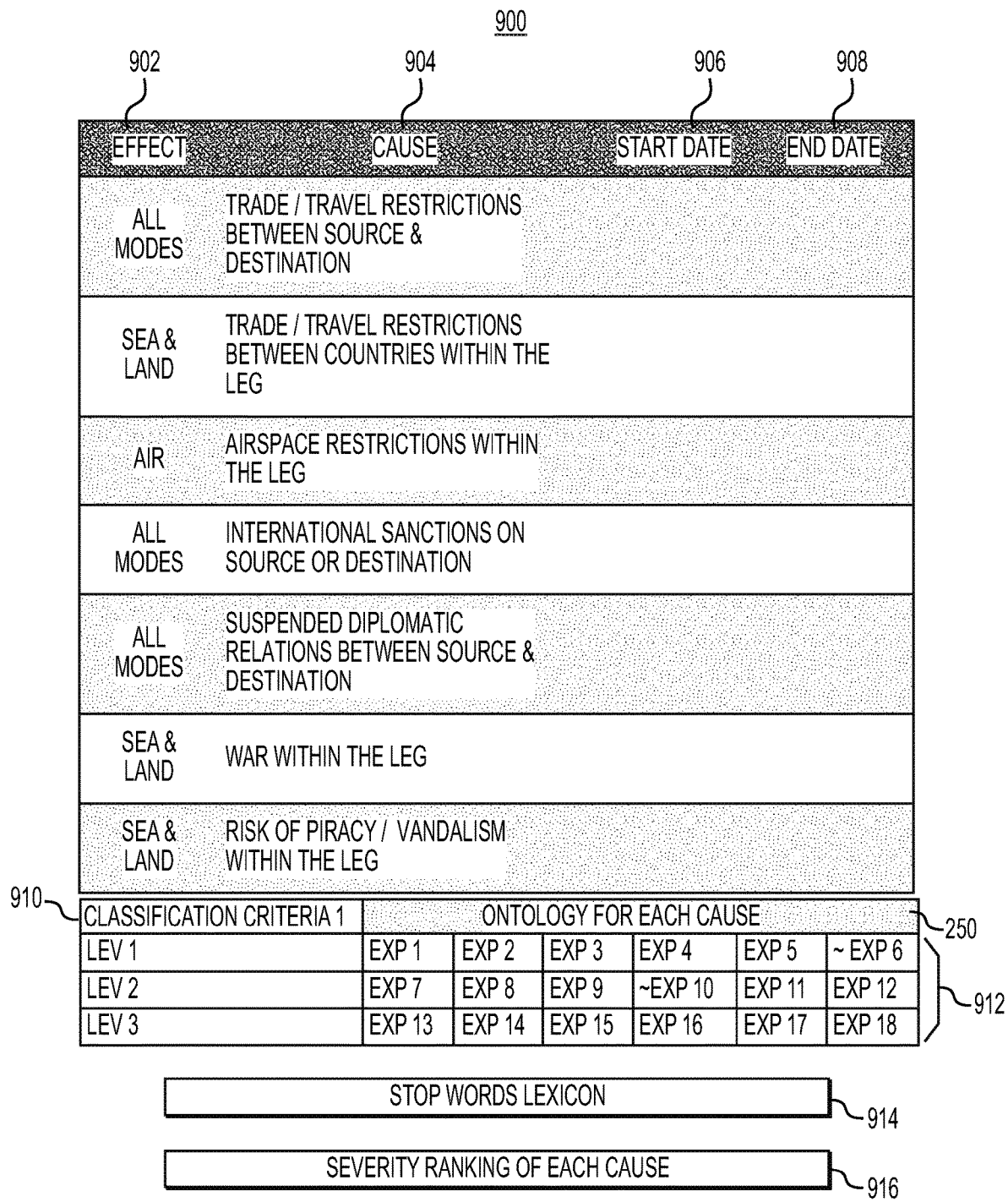
FIG. 9 shows an example user interface for a cause-effect table linked to an ontology.

FIG. 9 shows an example user interface for a cause-effect table 900 linked to the ontology 250. Table 900 can include columns for Effect 902, Cause 904, Start date 906, and End date 908. The effect 902 column lists the various delivery modes data affected by the causes/keywords listed in the row under the Cause 904 column. In addition, a start date and an end date when the modes are influenced by the causes can also be listed in the start date 906 and the End date 908 column therefore, the severity levels can be adjusted based on the start dates and the end dates listed for a given cause. Each of the causes is associated with a list of keywords/expressions 912 e.g., Exp 1, Exp 2, . . . , Exp 18 in the ontology 250. Furthermore, the list of expressions 912 is also mapped to classification criteria 910 which include different severity levels. The keywords extracted from the news articles are matched to the expressions in the list of expressions 912 and the corresponding severity level in order to determine the severity level of the new article. In example, the ontology 250 may also include stop words lexicon 914 (which includes stop words to be removed while analyzing the textual content of the news articles) and a severity ranking 916 of each cause based on the aggregated levels obtained from the number of expressions from the news article that match the expressions in the list of expressions 912. As mentioned above, the severity ranking may include the highest severity level associated with the matching expressions or the severity ranking may include the median severity level identified from the severity levels for the matching expressions.

Figure 10:
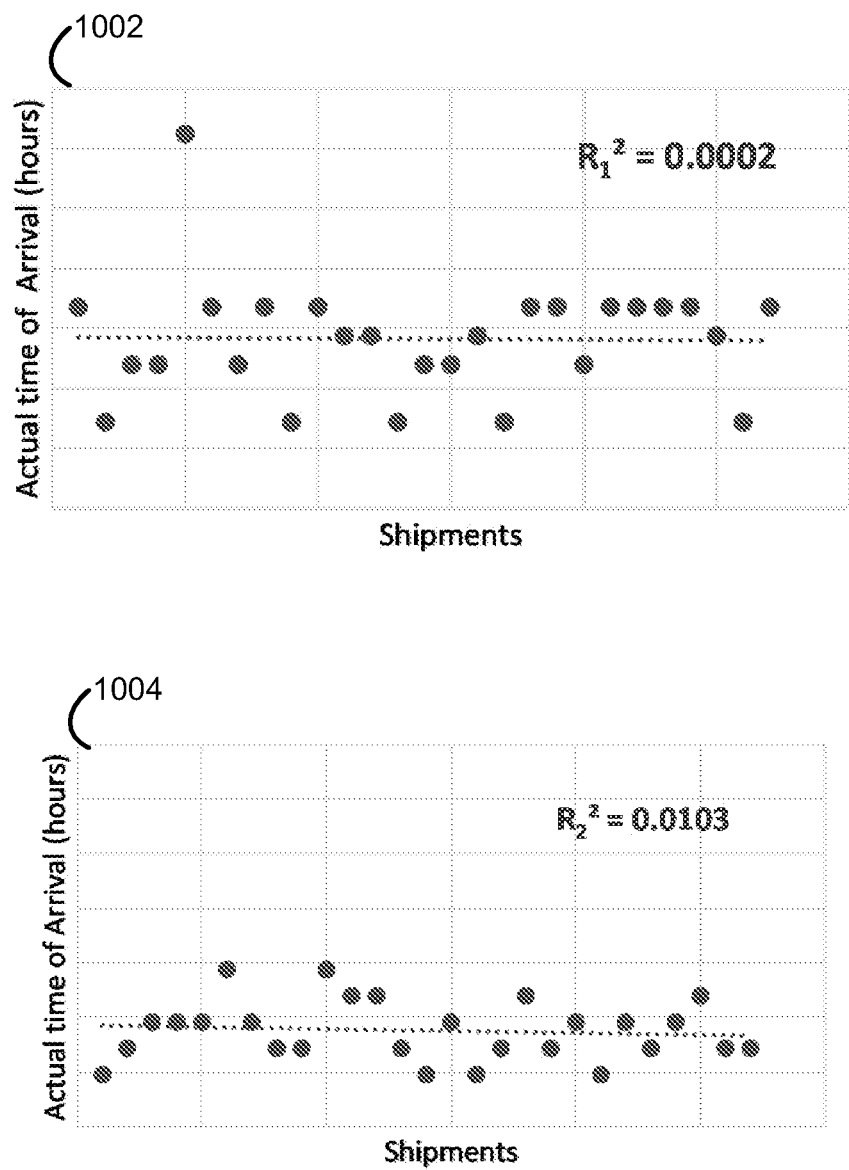
FIG. 10 shows two charts that represent the results of noise removal on the training data in accordance with the examples disclosed herein.

FIG. 10 shows two charts that represent the results of noise removal on the training data in accordance with the examples disclosed herein. The charts 1002 and 1004 map the shipments to the ATA in hours clustered by source+destination, carrier, delivery mode, delivery route, and month. The actual time of arrival (ATA) is a function of the estimated time of arrival (ETA) which in turn depends on external factors like weather, equipment reliability, port, road & canal congestion, accident, climate change, geopolitics &, etc. and transactional factors like delivery mode, lane, carrier, customer behavior, customs clearance, etc. In some examples, customer behavior may be factored into the delivery time of the package wherein a customer may frequently request that the shipment be held with the shipper, etc. In such instances, the delivery may be delayed to optimize warehouse costs and this is factored into the ATA estimate. In an example, the risk due to customer delay can be estimated as a numerical value that is normalized when applied by the selected ATA estimation model in the ATA estimate generation. Similarly, delays caused due to customs clearances may also be factored into the ATA estimates. In an example, the delay due to customs clearance can be configured as a categorical variable which is converted to binary code to be used for the ATA estimate generation. In graph 1002, where the weekend noise is taken into account, the data is highly disbursed with $R_1^2$ in the order of $1\ E^{-4}$. In graph 1004 wherein the weekend noise is removed, it can be observed that while the data is highly disbursed with $R_2^2=1E^{-2}$ the degree of dispersion is reduced by two orders of 10 due to the removal of the weekend noise.

FIG. 11 shows table 1100 which includes details of some features or attributes of the shipment/package, the delivery route, and the delivery mode that are processed for the generation of the ATA estimate in accordance with the examples disclosed herein. It may be appreciated that the details are included herein by way of examples and that other attributes can be provided to the plurality of ATA estimation models 182, . . . , 188, for the generation of the ATA estimates. The details include the information/attribute 1102, the source 1104 of the attribute, the data type 1106 from the source, the initial treatment 1108, the final data type 1110 to which the attribute is converted into when being provided to the ATA estimation model, and the final treatment 1112 used for converting the attribute from the data type 1106 obtained from the source to the final data type 1110. As discussed above, time series data such as the transactional weather across the different legs along the delivery routes, the equipment reliability data, the canal/road/port/airport congestion data, the geopolitical risks, the accident data, and the long term risk emanating from the climate change data are all converted into categorical data and finally into the binary data via one hot encoding.

Figure 12:
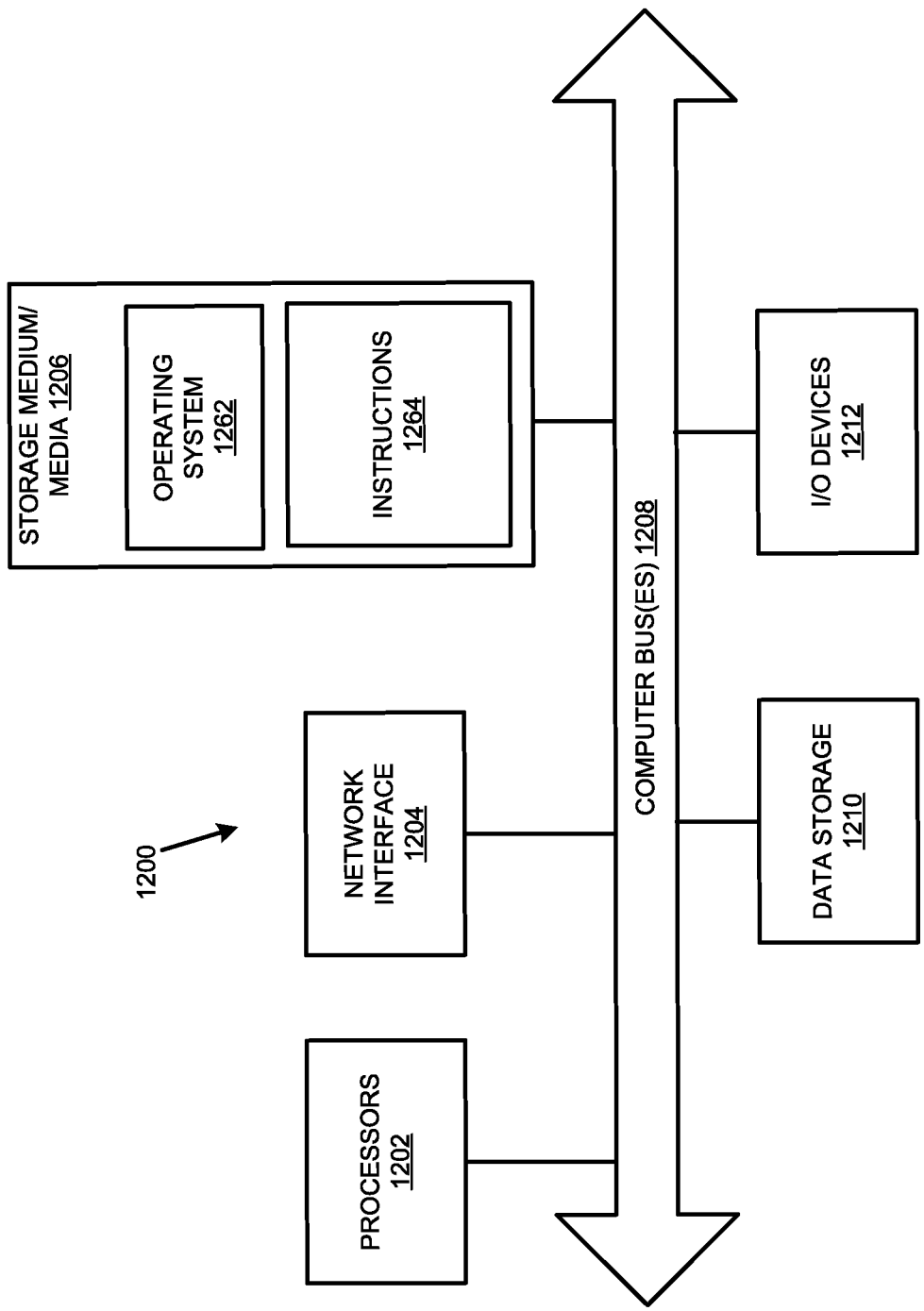
FIG. 12 illustrates a computer system that may be used to implement the time advisory system in accordance with the examples disclosed herein.

FIG. 12 illustrates a computer system 1200 that may be used to implement the delivery estimate system 100. More particularly, computing machines such as desktops, laptops, smartphones, tablets, and wearables which may be used to generate or access the data from the delivery estimate system 100 may have the structure of the computer system 1200. The computer system 1200 may include additional components not shown and that some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or another type of processing circuit, input/output devices 1212, such as a display, mouse keyboard, etc., a network interface 1204, such as a Local Area Network (LAN), a wireless 802.11x LAN, a 3G, 4G or 5G mobile WAN or a WiMax WAN, and a processor-readable medium 1206. Each of these components may be operatively coupled to a bus 1208. The computer-readable medium 1206 may be any suitable medium that participates in providing instructions to the processor(s) 1202 for execution. For example, the processor-readable medium 1206 may be a non-transitory or non-volatile medium, such as a magnetic disk or solid-state non-volatile memory, or a volatile medium such as RAM. The instructions or modules stored on the processor-readable medium 1206 may include machine-readable instructions 1264 executed by the processor(s) 1202 that cause the processor(s) 1202 to perform the methods and functions of the delivery estimate system 100.

The delivery estimate system 100 may be implemented as software stored on a non-transitory processor-readable medium and executed by one or more processors 1202. For example, the processor-readable medium 1206 may store an operating system 1262, such as MAC OS, MS WINDOWS, UNIX, or LINUX, and code 1264 for the delivery estimate system 100. The operating system 1262 may be multi-user, multiprocessing, multitasking, multithreading, real-time, and the like. For example, during runtime, the operating system 1262 is running and the code for the delivery estimate system 100 is executed by the processor(s) 1202.

The computer system 1200 may include a data storage 1210, which may include non-volatile data storage. The data storage 1210 stores any data used by the delivery estimate system 100. The data storage 1210 may be used to store the ATA estimate request 152, the data extracted from the ATA estimate request 152 the current data 194, the categorical variables, etc., which are generated and/or used during the operation of the delivery estimate system 100.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI)-based delivery time estimation system, comprising:
   at least one processor;
   a non-transitory processor-readable medium storing machine-readable instructions that cause the processor to:

transform at least one time series data set into categorical data including multiple categories with a finite set of values,
  wherein the at least one time series data set is retrieved from historical data stored in at least one of a plurality of external data sources that store the historical data and current data pertaining to delivery routes and delivery modes of the delivery routes;
  store the categorical data generated from the historical data as a training data set,
  wherein the historical data is clustered based on logical legs that are comprised within the delivery routes;
convert the categorical data in the training data set into binary data;
train a plurality of Actual Time of Arrival (ATA) estimation models including neural networks on the binary data in the training data set,
  wherein the plurality of ATA estimation models are trained for particular delivery routes and corresponding delivery modes;
receive an ATA estimate request for a shipment with shipment delivery attributes including a current delivery route and a current delivery mode;
select at least one of a plurality of ATA estimation models trained to generate a delivery time estimation for at least the current delivery route and the current delivery mode;
obtain the current data from the plurality of external data sources,
  wherein the current data includes a portion of data including at least one time series dataset updated to the plurality of external data sources for a predetermined time period immediately preceding a receipt date of the ATA estimate request;
transform the at least one time series data set in the current data set to categorical data including multiple categories;
convert the categorical data obtained from the at least one time series data set into binary data prior to providing the current data to the selected ATA estimation model;
provide the binary data generated from the current data to the selected ATA estimation model trained to generate the delivery time estimate for at least the delivery route and the delivery mode; and
obtain the delivery time estimate for the shipment from the selected ATA estimation model,
  wherein the delivery time estimate is generated by the selected ATA estimation model prior to shipping the shipment and based on the current data.

2. The delivery time estimation system of claim 1, wherein the plurality of external data sources include at least traffic congestion feed, weather feed, accident data, a news feed, and equipment reliability data.

3. The delivery time estimation system of claim 2,
  wherein the at least one time series data set includes a plurality of time series data sets that pertain to at least the traffic congestion feed, the weather feed, the accident data, the equipment reliability data, customer behavior data, and customs clearance data, and
  the multiple categories of the categorical data include a plurality of risk levels including a high-risk, a medium-risk and a low-risk.

4. The delivery time estimation system of claim 2, wherein the instructions further cause the processor to:
  cluster using a clustering algorithm and based on the logical legs, the historical data from the traffic congestion feed, the weather feed and the accident data.

5. The delivery time estimation system of claim 2, wherein the historical data includes the weather data feed and the instructions further cause the processor to:
  for each of the logical legs wherein each logical leg includes a starting location and an ending location:
    divide weather data from the weather feed based on years for each location between and including the starting location and the ending location;
    determine upper control limit and a lower control limit for predetermined ranges of years by employing best fit regression formula; and
    determine risk for each of the years based on average year temperature exceeding the upper control limit or falling below the lower control limit.

6. The delivery time estimation system of claim 2, wherein the historical data includes the news feed and the instructions further cause the processor to:
  for each of the logical legs wherein each logical leg includes a starting location and an ending location:
    select news articles from the news feed associated with each location between and including the starting location and the ending location; and
    process text in the news articles by stemming and lemmatization and removing stop words.

7. The delivery time estimation system of claim 6, wherein the processor is to further:
  for each of the news articles:
    extract keywords from the processed text; and
    determine severity of the impact of each of the keywords from the news article on delivery via the logical leg by comparing the keywords with expressions in an ontology.

8. The delivery time estimation system of claim 6, wherein the processor is to further:
  for each of the news articles:
    identify negative sentiments associated with each of the news articles based on expressions that are combinations of negative words and words from an exceptions list in an ontology, wherein the negative sentiments increase severity and risk rating for the logical leg.

9. The delivery time estimation system of claim 7, wherein the processor is to further:
  obtain a final risk rating for each of the logical legs for the news feed based on a highest severity rating from the severity ratings obtained for the keywords for the logical leg, wherein the final risk rating is selected from a plurality of risk ratings; and
  determine as the risk rating for the delivery route, a highest risk rating from the final risk ratings associated with each of the logical legs.

10. The delivery time estimation system of claim 9, wherein to obtain the delivery time estimate for the shipment from the selected ATA estimation model the processor is to further:
  calculate a normalized actual time of arrival (ATA) for the shipment along the current delivery route via the current delivery mode, the normalized ATA is calculated based on an aggregated risk obtained by aggregating customs risk, news risk, port congestion risk, weather risk, and customer behavior risk.

11. A method of determining a delivery time estimate comprising:
  training a plurality of actual time of arrival (ATA) estimation models including neural networks in generating ATA estimates for shipments, wherein each ATA estimation model is trained to generate an ATA estimate for a specific delivery route and a delivery mode for the specific delivery route;
receiving an ATA estimate request for a shipment to be shipped;
determining a delivery route and a delivery mode for the ATA estimate request;
selecting one of the plurality of ATA estimation models for generating an ATA estimate in response to the ATA estimate request,
wherein the selected ATA estimation model is trained for ATA estimate generation for the delivery route and the delivery mode associated with the ATA estimate request;
retrieving current data for the delivery route and the delivery mode associated with the ATA estimate request,
wherein the current data includes at least one time series data set retrieved from one or more of a plurality of external data sources;
transforming the at least one time series data set into categorical data of multiple categories;
converting the categorical variable corresponding to the at least one time series data set in the current data to binary data;
providing the binary data obtained from the current data to the selected ATA estimation model; and
obtaining an ATA estimate for the shipment from the ATA estimation model.

12. The method of claim 11, further comprising:
removing weekend noise from the at least one time series data prior to providing the at least one time series data to the selected ATA estimation model; and
generating a final result which includes an ATA by optimizing the ATA estimate for weekends and holidays.

13. The method of claim 11, wherein training the plurality of ATA estimation models further comprises:
accessing historical data from a plurality of external data sources, wherein the historical data includes at least one historical time series data set.

14. The method of claim 13, further comprising:
converting the at least one historical time series data set in the historical data to a corresponding categorical variable that assumes values from a plurality of risk levels that indicate a risk of delay in delivering the shipment through the delivery route and via the delivery mode.

15. The method of claim 14, further comprising:
converting the categorical variable corresponding to the at least one historical time series data set in the historical data to binary data via one hot encoding technique prior to providing the historical data for training the plurality of ATA estimation models; and
converting the categorical variable corresponding to the at least one time series data set in the current data to the binary data via one hot encoding technique.

16. The method of claim 12, wherein at least one of the plurality of external data sources includes an equipment reliability data source and the categorical variable provides the risk of delay in delivering the shipment due to transport equipment failure.

17. A non-transitory processor-readable storage medium comprising machine-readable instructions that cause a processor to:
transform at least one set of historical time series data into categorical data including multiple categories with a finite set of values,
wherein the historical time series data is retrieved from at least one of a plurality of external data sources that store historical data and current data pertaining to delivery routes and delivery modes of the delivery routes;
store the categorical data generated from the historical time series data as a training data set,
wherein the historical data is clustered based on logical legs that are comprised within the delivery routes;
convert the categorical data in the training data set into binary data;
train a plurality of Actual Time of Arrival (ATA) estimation models including neural networks on the binary data in the training data set;
receive an ATA estimate request for a package with package delivery attributes including a current delivery route and a current delivery mode;
select at least one of a plurality of ATA estimation models trained to generate an ATA estimate for at least the delivery route and the delivery mode;
obtain the current data from the plurality of external data sources, wherein the current data includes a portion of data updated to the plurality of external data sources for a predetermined time period immediately preceding a receipt date of the ATA estimate request;
convert at least one time series data in the current data to categorical data including multiple categories;
transform the categorical data obtained from the at least one time series data set into binary data prior to providing the current data to the selected ATA estimation model;
provide the binary data generated from the current data to the selected ATA estimation model trained to generate the delivery time estimate for at least the delivery route and the delivery mode; and
obtain the ATA estimate for the package from the selected delivery time estimation model,
wherein the ATA estimate is generated by the selected ATA estimation model based on the current data.

18. The non-transitory processor-readable storage medium of claim 17, further comprising instructions that cause the processor to:
remove weekend noise from the at least one time series data prior to being provided to the selected ATA estimation model; and
generate a final result that includes an ATA by optimizing the ATA estimate for weekends and holidays.

19. The non-transitory processor-readable storage medium of claim 17, further comprising instructions that cause the processor to:
provide to the selected ATA estimation model in the current data, a numeric value signifying a risk due to a customer receiving behavior.

* * * * *